(12) United States Patent
Madjar et al.

(10) Patent No.: US 10,102,225 B2
(45) Date of Patent: Oct. 16, 2018

(54) SYSTEMS AND METHODS FOR TIME-BASED ASSOCIATION OF CONTENT AND PROFILE INFORMATION

(71) Applicant: Facebook, Inc., Menlo Park, CA (US)

(72) Inventors: Alexander Matthew Madjar, San Francisco, CA (US); Valentin Stanciu, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 427 days.

(21) Appl. No.: 14/561,009

(22) Filed: Dec. 4, 2014

(65) Prior Publication Data

US 2016/0162513 A1  Jun. 9, 2016

(51) Int. Cl.
*G06F 17/30* (2006.01)
*G06F 21/62* (2013.01)
*G06Q 50/00* (2012.01)

(52) U.S. Cl.
CPC .... *G06F 17/30268* (2013.01); *G06F 17/3028* (2013.01); *G06F 17/30867* (2013.01); *G06Q 50/01* (2013.01); *G06F 21/6245* (2013.01)

(58) Field of Classification Search
CPC ........... G06F 17/30268; G06F 17/3028; G06F 17/30867; G06F 21/6245; G06Q 50/01
See application file for complete search history.

(56) References Cited

U.S. PATENT DOCUMENTS

| | | | | |
|---|---|---|---|---|
| 8,867,849 | B1* | 10/2014 | Kirkham | G06F 17/30268 382/224 |
| 2008/0294663 | A1* | 11/2008 | Heinley | G06F 3/0481 |
| 2012/0144296 | A1* | 6/2012 | Rao | G06Q 10/10 715/273 |
| 2012/0331399 | A1* | 12/2012 | Eidelson | H04M 1/72552 715/753 |
| 2013/0013700 | A1* | 1/2013 | Sittig | G06Q 10/10 709/206 |
| 2013/0156274 | A1* | 6/2013 | Buchmueller | G06Q 50/01 382/118 |
| 2014/0089816 | A1* | 3/2014 | DiPersia | G06F 3/0484 715/753 |

* cited by examiner

*Primary Examiner* — Jorge A Casanova
(74) *Attorney, Agent, or Firm* — Sheppard Mullin Richter & Hampton LLP

(57) ABSTRACT

Systems, methods, and non-transitory computer-readable media can identify a content item posted by a user. Time data associated with the content item can be acquired. A profile picture can be identified, based at least in part on the time data, out of a set of profile pictures associated with the user. The profile picture can be provided in association with the content item.

20 Claims, 10 Drawing Sheets

SYSTEMS AND METHODS FOR TIME-BASED ASSOCIATION OF CONTENT AND PROFILE INFORMATION

FIELD OF THE INVENTION

The present technology relates to the field of providing online content. More particularly, the present technology relates to techniques for time-based association of content and profile information.

BACKGROUND

Today, people often utilize computing devices (or systems) for a wide variety of purposes. Users can use their computing devices to, for example, interact with one another, create content, share information, and access information. In some cases, a user of a social networking system (or service) can utilize his or her computing device to create and post content. Under conventional approaches, the content can be provided or presented at a profile page of the user, at profile pages of other users, and elsewhere within the social network system. The user's connections or friends within the social networking system can access or view the posted content, as long as the user's privacy settings so allow.

In one example, under conventional approaches, a content item posted by the user is presented with a current profile picture of the user. If a viewer attempts to view the content item at a later time and if the user has updated his or her profile picture since then, the viewer will be presented with the content item and the updated profile picture (e.g., a current profile picture) of the user, in accordance with conventional approaches. However, under conventional approaches, there can be an insufficient nexus between the content item posted by the user and the updated or current profile picture of the user. Moreover, such conventional approaches to providing content can be boring and uninteresting. These and other similar concerns of conventional approaches can reduce the overall user experience associated with accessing provided content.

SUMMARY

Various embodiments of the present disclosure can include systems, methods, and non-transitory computer readable media configured to identify a content item posted by a user. Time data associated with the content item can be acquired. A profile picture can be identified, based at least in part on the time data, out of a set of profile pictures associated with the user. The profile picture can be provided in association with the content item.

In an embodiment, the identifying of the profile picture out of the set of profile pictures can further comprise acquiring a respective timestamp for each profile picture in the set of profile pictures associated with the user. The respective timestamp for each profile picture and the time data associated with the content item can be analyzed. The time data associated with the content item can indicate a time when the content item was posted. A particular profile picture having a timestamp that is nearest to, without being later than, the time when the content item was posted can be determined. The particular profile picture can be identified as the profile picture to be provided in association with the content item.

In an embodiment, the identifying of the profile picture out of the set of profile pictures can further comprise acquiring a respective timestamp for each profile picture in the set of profile pictures associated with the user. A most recent profile picture out of the set of profile pictures can be determined based at least in part on the respective timestamp for each profile picture. The time data associated with the content item can be analyzed to determine that the content item was posted at or after a time indicated by a timestamp for the most recent profile picture. The most recent profile picture can be identified as the profile picture to be provided in association with the content item.

In an embodiment, it can be determined, based at least in part on one or more privacy settings associated with the user, that a particular profile picture in the set of profile pictures is inaccessible to a particular viewer. The particular profile picture can be prevented from being provided in association with the content item when the content item is provided to the particular viewer.

In an embodiment, it can be detected that a particular profile picture is removed from the set of profile pictures. The particular profile picture can be prevented from being provided in association with the content item when the content item is provided to the particular viewer.

In an embodiment, the profile picture to be provided in association with the content item can correspond to a current profile picture of the user when other profile pictures in the set of profile pictures are unable to be provided in association with the content item.

In an embodiment, the content item can be posted by the user to at least one of a group associated with the user or an event associated with the user.

In an embodiment, a mouse hover over the profile picture provided in association with the content item can be detected. A hover card can be provided for the user while the mouse hover is detected. The hover card can include a current profile picture of the user.

In an embodiment, the content item posted by the user is associated with at least one of a media content item posted by the user, text posted by the user, a status update posted by the user, a message posted by the user, a comment posted by the user, a content like posted by the user, a shared content item posted by the user, or a story content item posted by the user (or posted due to one or more user actions).

In an embodiment, the set of profile pictures can correspond to a profile picture album associated with the user at a social networking system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
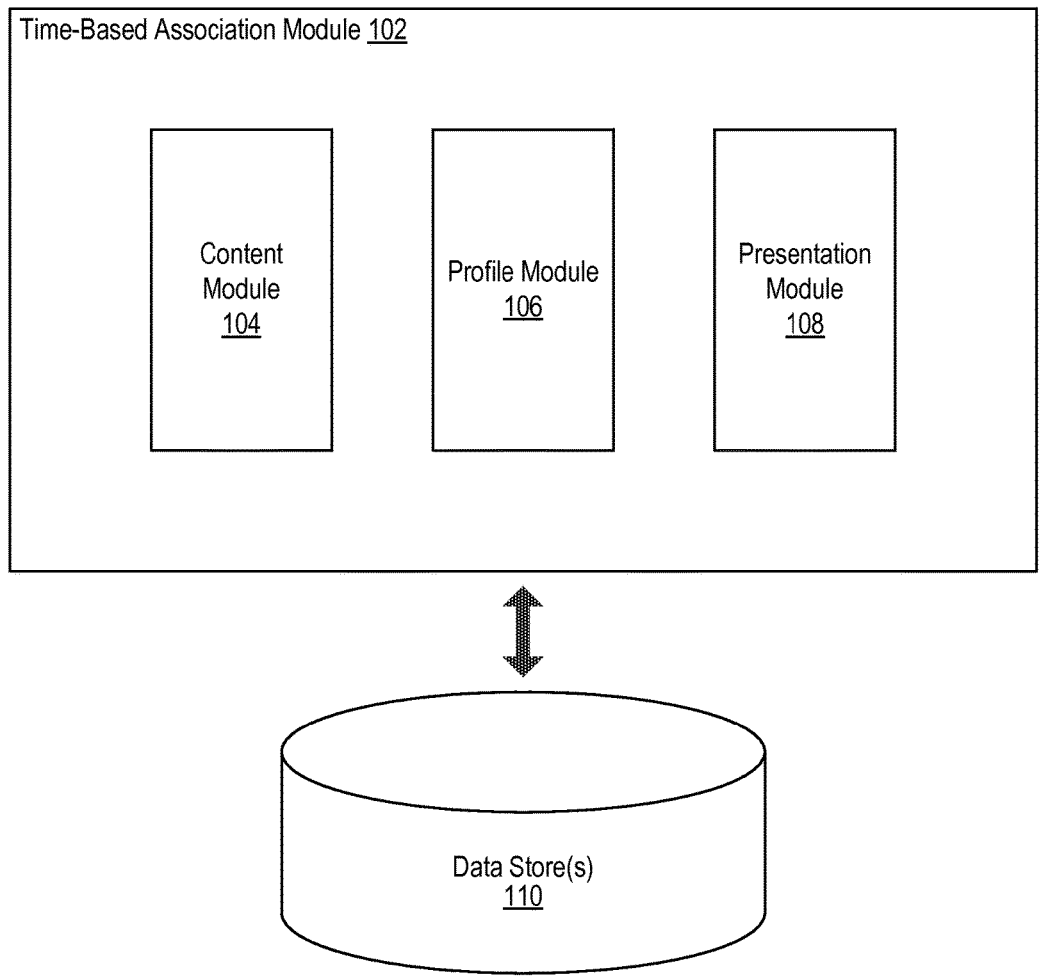
FIG. 1 illustrates an example system including an example time-based association module configured to facilitate time-based association of content and profile information, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Time-Based Association of Content and Profile Information

People use computing devices (or systems) for a wide variety of purposes. Computing devices can provide different kinds of functionality. Users can utilize their computing devices to produce information, access information, and share information. In some cases, users can utilize computing devices to interact or engage with a social networking system (or service). For example, users can post or publish, at the social networking system, content items such as status updates, images, videos, text, shared items, content likes, comments, messages, or other content.

In some instances, content posted or published by a user can be viewed or accessed by an audience including one or more audience members (e.g., viewers). Conventional approaches to providing content typically involve presenting the content posted (or published) by the user in conjunction with the user's current profile picture. As such, in accordance with conventional approaches, one or more viewers can view the user's current profile picture when accessing or viewing the content posted by the user.

In one example, the user had posted a content item a long time ago and has recently updated his or her profile picture. Under conventional approaches, when a viewer attempts to access the user's content item from long ago, the user's updated profile picture (e.g., current profile picture) will be provided to the viewer with the content item from long ago. In this example, there may not be a sufficient nexus or a substantial likelihood of relevance between the current profile picture of the user and the content item posted from long ago. There can be a significant time difference between the time the content item was posted and the time associated with the current profile picture. This can cause confusion for the viewer of the content item. Moreover, such conventional approaches to providing content can be boring, and rigid. For example, under conventional approaches, when viewers browse through various content items posted by the user at different times, the viewers will always be presented with the user's current profile picture. Accordingly, conventional approaches to providing and accessing content can be uninteresting, irrelevant, and inefficient.

Therefore, an improved approach can be beneficial for addressing or alleviating various concerns associated with conventional approaches. The disclosed technology can provide time-based association of content and profile information. Various embodiments of the present disclosure can identify a content item posted by a user. Time data associated with the content item can be acquired. A profile picture can be identified, based at least in part on the time data, out of a set of profile pictures associated with the user. The profile picture can be provided in association with the content item. It is contemplated that there can be many variations and/or other possibilities.

FIG. 1 illustrates an example system 100 including an example time-based association module 102 configured to facilitate time-based association of content and profile information, according to an embodiment of the present disclosure. As shown in the example of FIG. 1, the example time-based association module 102 can include a content module 104, a profile module 106, and a presentation module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the time-based association module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the time-based association module 102 can be implemented, in part or in whole, as software running on one or more computing devices or systems, such as on a user or client computing device. For example, the time-based association module 102 or at least a portion thereof can be implemented as or within an application (e.g., app), a program, or an applet, etc., running on a user computing device or a client computing system, such as the user device 710 of FIG. 7. In another example, the time-based association module 102 or at least a portion thereof can be implemented using one or more computing devices or systems that include one or more servers, such as network servers or cloud servers. In some instances, the time-based association module 102 can, in part or in whole, be implemented within or configured to operate in conjunction with a social networking system (or service), such as the social networking system 730 of FIG. 7. It should be understood that there can be many variations or other possibilities.

In some embodiments, the content module 104 can be configured to facilitate identifying a content item posted by a user. For example, when another user attempts to view a particular content item posted by the user, the particular content item can be identified by the content module 104. The content module 104 can be further configured to facilitate acquiring time data associated with the content item. The content module 104 can, for example, acquire time data (e.g., a timestamp) that indicates a time when the content item was posted by the user. More details regarding the content module 104 will be provided below with reference to FIG. 2A.

In some implementations, the profile module 106 can be configured to facilitate identifying, based at least in part on the time data, a profile picture out of a set of profile pictures associated with the user. For example, the profile module 106 can utilize at least in part time data indicating a time when a content item was posted in order to identify a particular profile picture that is temporally relevant to the time when the content item was posted. The profile module 106 will be discussed in more detail below with reference to FIG. 2B.

Furthermore, in some embodiments, the time-based association module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data. In some embodiments, the at least one data store 110 can store information related to content items posted by the user, which can be utilized by the content module 104. The information related to the content items can include, but is not limited to, data representing the content items as well as time data associated with the content items. In addition, the data store 110 can store information related to the user's profile, which can be utilized by the profile module 106. The information related to the user's profile can include, but is not limited to, profile pictures of the user as well as time data associated with the profile pictures. It should be appreciated that there can be many variations and other possibilities.

Moreover, the presentation module 108 can be configured to facilitate presenting, displaying, or otherwise providing the profile picture in association with the content item. The presentation module 108 can provide the profile picture identified by the profile module 106 and the content item identified by the content module 104. In some cases, the presentation module 108 can present the profile picture adjacent to where the content item is presented on a display element (e.g., display screen, touch screen, etc.) of an audience or a viewer of the content item. Again, many variations are possible.

In one example, the user uploads a first profile picture in January. The user posts a first content item in February. Then in October, the user changes his or her profile picture to a second profile picture. In November, the user posts a second content item. In this example, it is assumed that the user has given consent (based on the user's privacy settings) for a particular viewer to view the user's content items and profile pictures. As such, if the particular viewer visits the user's profile page in December, the viewer can be presented with the second profile picture as the user's current profile picture. Moreover, when the viewer accesses or views the second content item, the second content item can be presented to the viewer in conjunction with the second profile picture of the user. However, when the viewer browses to older content including the first content item posted in February, the viewer will be provided with the user's first profile picture in conjunction with the first content item. Accordingly, there can be an increased likelihood of relevance between the user's profile pictures and posted content items. It should be understood that this example is provided for illustrative purposes and that there can be many variations and other possibilities.

Figure 2A:
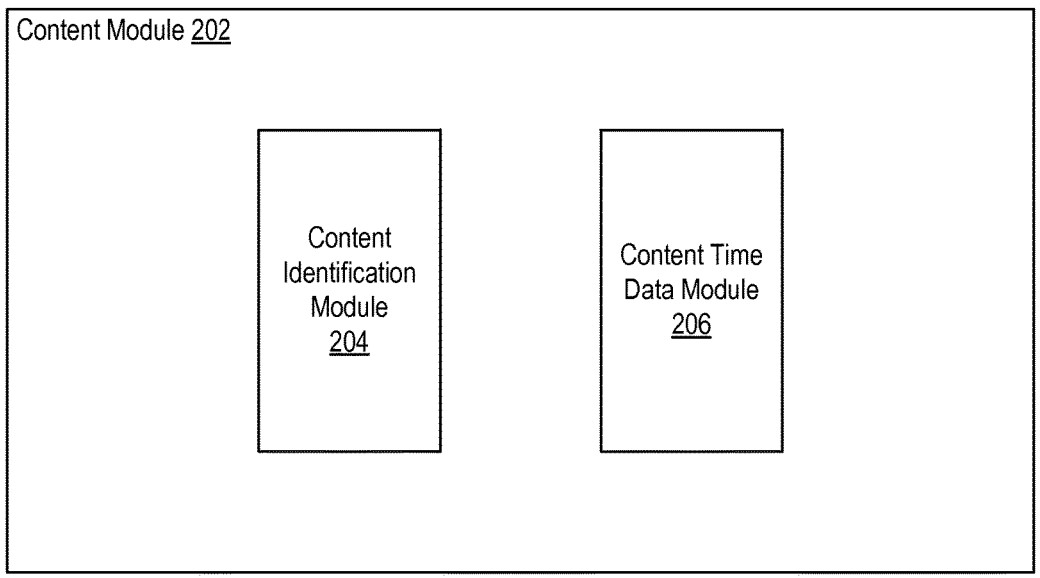
FIG. 2A illustrates an example content module configured to facilitate time-based association of content and profile information, according to an embodiment of the present disclosure.

FIG. 2A illustrates an example content module 202 configured to facilitate time-based association of content and profile information, according to an embodiment of the present disclosure. In some embodiments, the content module 104 of FIG. 1 can be implemented as the content module 202. As shown in FIG. 2A, the content module 202 can include a content identification module 204 and a content time data module 206.

As discussed previously, the content module 202 can be configured to facilitate identifying a content item posted by a user and to facilitate acquiring time data associated with the content item. In some implementations, the content module 202 can utilize the content identification module 204 to identify at least one content item posted by the user. For example, when an audience is attempting to access or view at least one particular content item posted by the user, the content identification module 204 can identify the at least one particular content item. In some instances, the at least one content item posted by the user can be associated with at least one of a media content item posted by the user, text posted by the user, a status update posted by the user, a message posted by the user, a comment posted by the user, a content like posted by the user, a shared content item posted by the user, or a story content item posted by the user (or posted due to one or more user actions).

In some embodiments, the content module 202 can utilize the content time data module 206 to acquire time data associated with the at least one identified content item. For example, time data acquired for an identified content item by the content time data module 206 can indicate a time when the identified content item was posted. In some cases, the time data for the identified content item can include a timestamp associated with the posting of the identified content item. It is contemplated that many variations are possible.

Figure 2B:
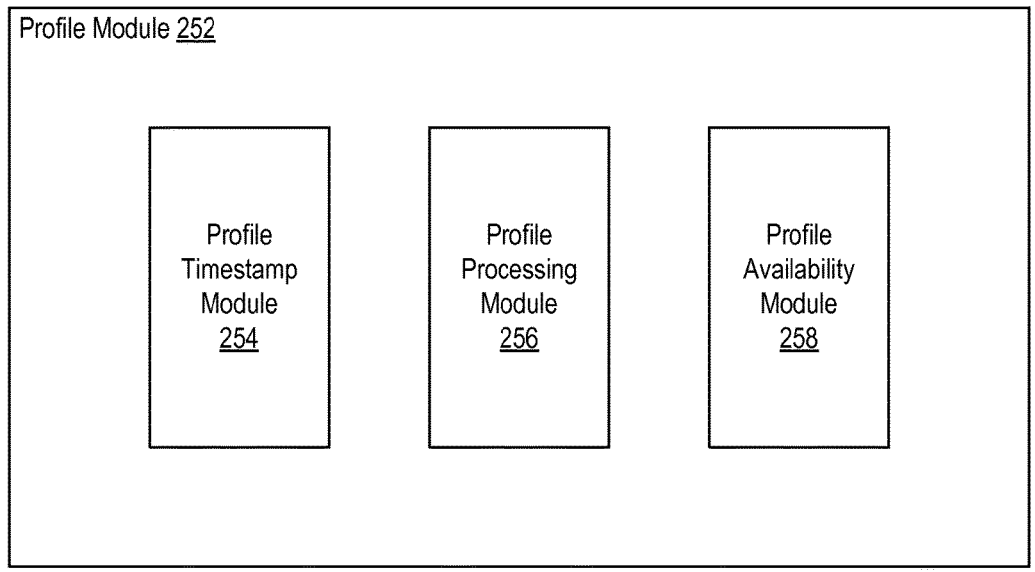
FIG. 2B illustrates an example profile module configured to facilitate time-based association of content and profile information, according to an embodiment of the present disclosure.

FIG. 2B illustrates an example profile module 252 configured to facilitate time-based association of content and profile information, according to an embodiment of the present disclosure. In some embodiments, the profile module 106 of FIG. 1 can be implemented as the profile module 252. As shown in FIG. 2B, the profile module 252 can include a profile timestamp module 254, a profile processing module 256, and a profile availability module 258.

As discussed above, the profile module 252 can be configured to facilitate identifying, based at least in part on the time data associated with the content item, a profile picture out of a set of profile pictures associated with the user. The set of profile pictures associated with the user can, for example, correspond to a profile picture album of the user at a social networking system (e.g., the social networking system 730 of FIG. 7).

In some embodiments, the profile module 252 can utilize the profile timestamp module 254 to acquire a respective timestamp for each profile picture in the set of profile pictures associated with the user. For example, the profile timestamp module 254 can receive, obtain, retrieve, or otherwise acquire a first timestamp for a first profile picture in the set, a second timestamp for a second profile picture in the set, a third timestamp for a third profile picture in the set, and so forth. The respective timestamp for each profile picture can indicate, for example, when each profile picture was posted, taken, uploaded, or published.

In some embodiments, the profile module 252 can utilize the profile processing module 256 to analyze the respective timestamp for each profile picture and the time data associated with the content item, which can be acquired from the content module 202 of FIG. 2A. As discussed, the time data associated with the content item can indicate the time when the content item was posted. The profile processing module 256 can determine or identify a particular profile picture that has a timestamp nearest to, without being later than, the time when the content item was posted. The profile processing module 256 can thus identify the particular profile picture as the profile picture to be provided in association with the content item.

In some implementations, subsequent to the respective timestamp being acquired for each profile picture in the set, the profile processing module 256 can determine, based at least in part on the respective timestamp for each profile picture, a most recent profile picture out of the set of profile pictures. For example, the profile processing module 256 identify a user's current profile picture out of the set by taking into account the timestamps of the user's profile pictures in the set. The profile processing module 256 can also analyze the time data associated with the content item to determine whether or not the content item was posted at or after a time indicated by a timestamp for the most recent profile picture. If so, the profile processing module 256 can then identify the most recent profile picture as the profile picture to be provided in association with the content item. If not, then the profile processing module 256 can determine whether or not the content item was posted at or after a time indicated by a timestamp for a second most recent profile picture. If so, the profile processing module 256 can then identify the second most recent profile picture as the profile picture to be provided in association with the content item. This process can repeat with the third most recent profile picture, the fourth most recent profile picture, and so forth. In some cases, if no other profile pictures in the set of profile pictures are able to be provided in association with the content item, then the profile picture to be provided in association with the content item can correspond to the current profile picture of the user.

Moreover, the profile availability module 258 can be configured to determine whether or not certain profile pictures of the user are able or available to be provided in association with the content item. In some implementations, the profile availability module 258 can determine, based at least in part on one or more privacy settings associated with the user, that a particular profile picture in the set of profile pictures is inaccessible to a particular viewer. For example, if the user has set his or her privacy settings for the particular profile picture to be accessible by only the user and if the particular viewer is another user, then the particular viewer cannot view or access that particular profile picture. The profile availability module 258 can accordingly be configured to prevent the particular profile picture from being provided in association with the content item when the content item is provided to the particular viewer. In some cases, the current profile picture can instead be provided in association with the content item. In some instances, a generic profile picture can instead be provided. In some cases, no profile picture is provided.

Furthermore, in some embodiments, the profile availability module 258 can detect that a particular profile picture is removed from the set of profile pictures. For example, the user has deleted the particular profile picture. As such, the profile availability module 258 can prevent the particular (deleted) profile picture from being provided in association with the content item when the content item is provided to the particular viewer. In some cases, a current profile picture, a generic profile picture, or no profile picture can be provided instead. It is contemplated that there can be many variations and other possibilities.

Figure 3:
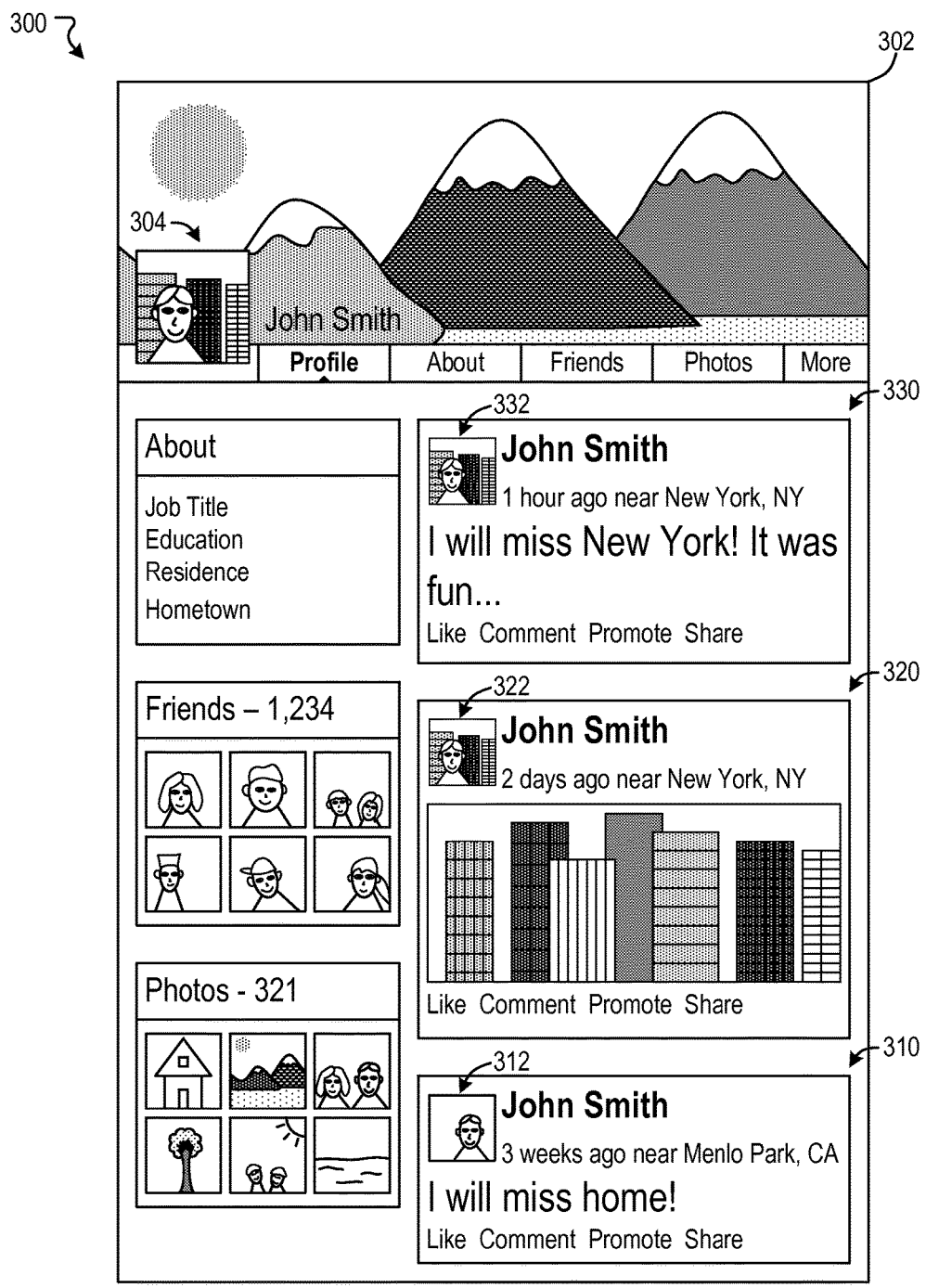
FIG. 3 illustrates an example scenario in which time-based association of content and profile information can be utilized, according to an embodiment of the present disclosure.

FIG. 3 illustrates an example scenario 300 in which time-based association of content and profile information can be utilized, according to an embodiment of the present disclosure. The example scenario 300 illustrates an example profile page 302 of a user, John Smith, within a social networking system (e.g., the social networking system 730 of FIG. 7). As shown in FIG. 3, the profile page 302 (i.e., a timeline, a wall, etc.) can provide a most recent or current profile picture 304 of John Smith.

In the example scenario 300, John Smith had posted a first content item 310 (e.g., a status update) three weeks ago on his profile page 302. Two weeks ago, John updated his profile picture from an old profile picture to the current profile picture 304. Two days ago, John posted a second content item 320 (e.g., an image) on his profile page 302. One hour ago today, John posted a third content item 330 (e.g., another status update) on his profile page 302.

In this example, when a viewer visits or accesses John's profile page 302, the first content item 310, the second content item 320, and the third content item 330 can be provided to the viewer. Moreover, as shown, John's old profile picture 312 can be provided with the first content item 310 since the first content item 310 was posted three weeks ago and John had not yet updated his profile picture to the current one 304. However, the profile picture 322 provided with the second content item 320 and the profile picture 332 provided with the third content item 330 can each correspond to the current profile picture 304 since John updated his profile picture to the current one 304 two weeks ago and since the second content item 320 and the third content item 330 were posted after that time. Accordingly, each profile picture can be more temporally and/or substantively relevant or related to its respective content item. It should be appreciated that this example scenario 300 is provided for illustrative purposes and that many variations are possible.

Figure 4:
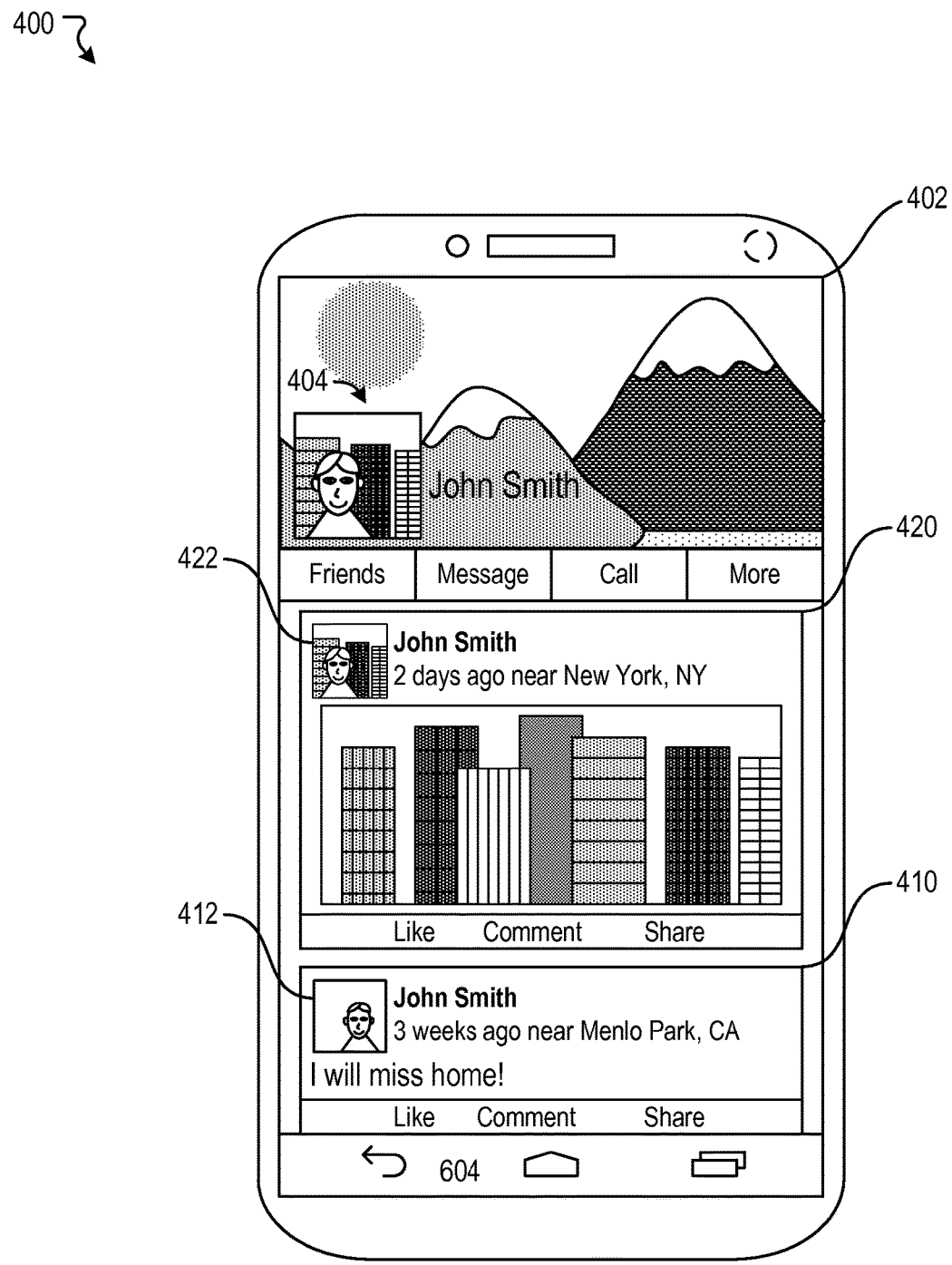
FIG. 4 illustrates an example scenario in which time-based association of content and profile information can be utilized, according to an embodiment of the present disclosure.

FIG. 4 illustrates an example scenario 400 in which time-based association of content and profile information can be utilized, according to an embodiment of the present disclosure. The example scenario 400 illustrates an example computing device of a viewer. The example computing device of the viewer can provide an example profile page 402 of a user, John Smith. The profile page 402 of John Smith can be accessible or viewable by the viewer. As shown in FIG. 4, the profile page 402 (i.e., a timeline, a wall, etc.) can provide a most recent or current profile picture 404 of John Smith.

In the example scenario 400, John Smith had posted a first content item 410 (e.g., a status update) three weeks ago on his profile page 402. Two weeks ago, John updated his profile picture from an old profile picture to the current profile picture 404. Two days ago, John posted a second content item 420 (e.g., an image). When the viewer visits or accesses John's profile page 402, the first content item 410 and the second content item 420 can be provided to the viewer. John's old profile picture 412 can be provided with the first content item 410 since the first content item 410 was posted three weeks ago and John had not yet updated his profile picture to the current one 404. However, the profile picture 422 provided with the second content item 420 can correspond to the current profile picture 404 since John updated his profile picture to the current one 404 two weeks ago and since the second content item 420 was posted after that time. Accordingly, each profile picture can be more temporally and/or substantively relevant or related to its respective content item.

It should be understood that this example scenario 400 is provided for illustrative purposes and that there can be many variations and other possibilities. For example, in some embodiments, at least some of the user's profile pictures can be stored locally at the viewer's computing device. In some implementations, at least some of the user's profile pictures can be stored remotely on one or more servers.

Figure 5:
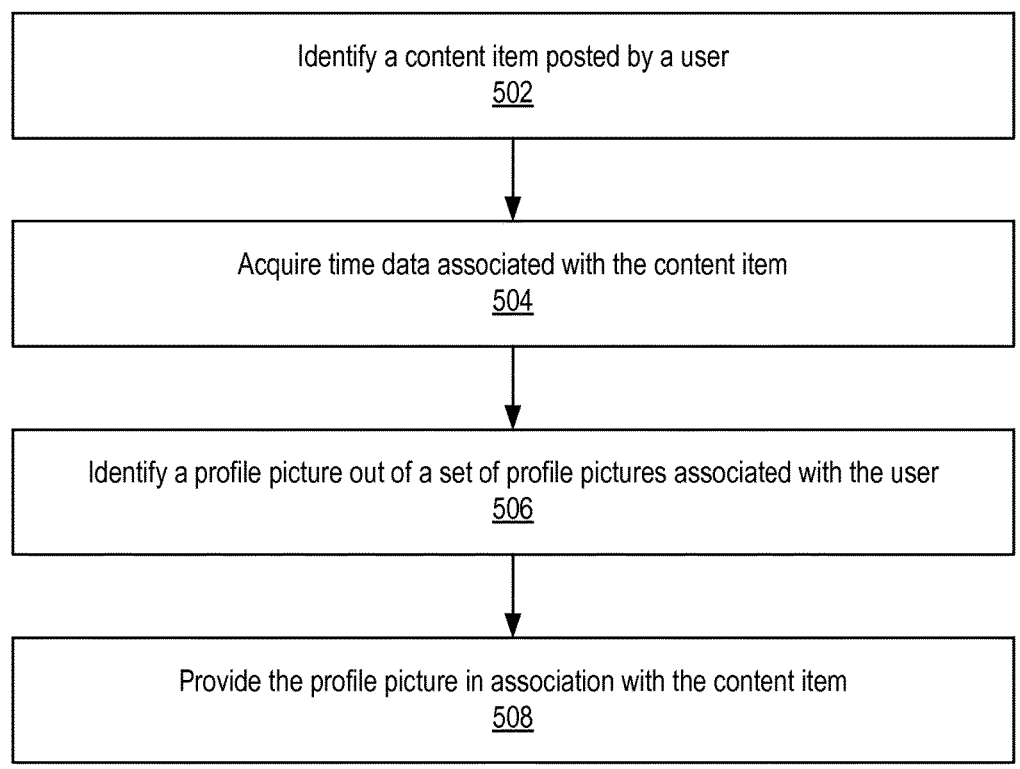
FIG. 5 illustrates an example method for implementing time-based association of content and profile information, according to an embodiment of the present disclosure.

FIG. 5 illustrates an example method 500 for implementing time-based association of content and profile information, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can identify a content item posted by a user. At block 504, the example method 500 can acquire time data associated with the content item. At block 506, the example method 500 can identify, based at least in part on the time data, a profile picture out of a set of profile pictures associated with the user. At block 508, the example method 500 can provide the profile picture in association with the content item.

Figure 6A:
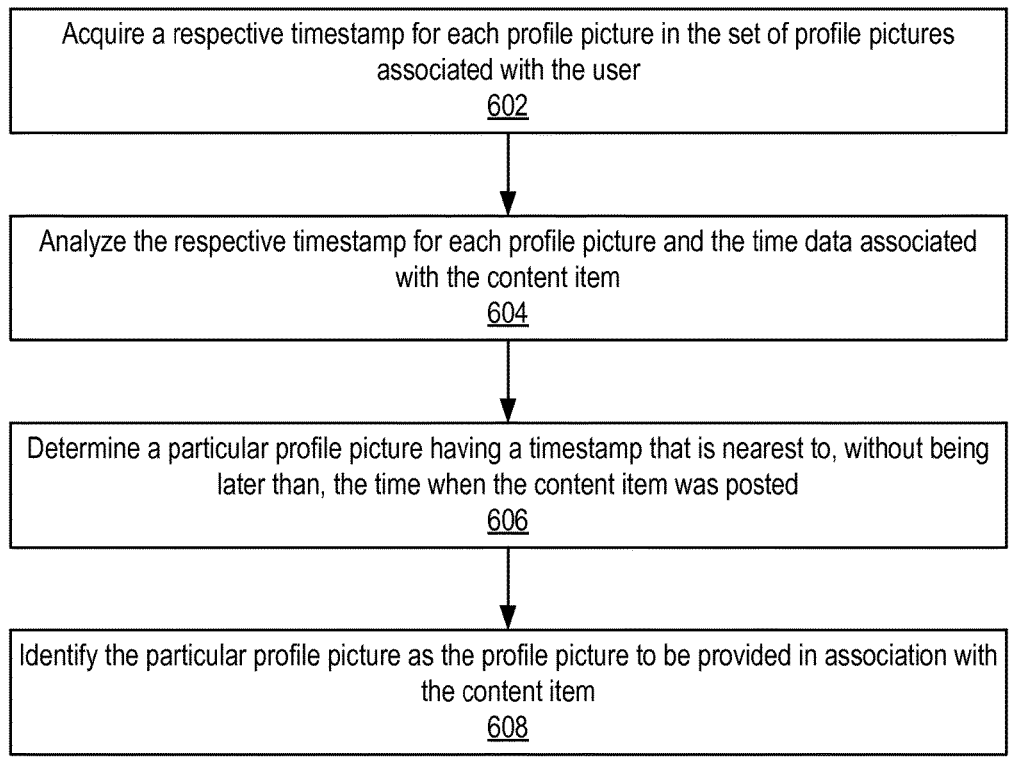
FIG. 6A illustrates an example method for implementing time-based association of content and profile information, according to an embodiment of the present disclosure.

FIG. 6A illustrates an example method 600 for implementing time-based association of content and profile information, according to an embodiment of the present disclosure. As discussed above, it should be understood that there can be additional, fewer, or alternative steps performed in similar or alternative orders, or in parallel, within the scope of the various embodiments unless otherwise stated.

The example method 600 can facilitate the identifying of the profile picture out of the set of profile pictures, as discussed above. At block 602, the example method 600 can acquire a respective timestamp for each profile picture in the set of profile pictures associated with the user. At block 604, the example method 600 can analyze the respective timestamp for each profile picture and the time data associated with the content item. The time data associated with the content item can indicate a time when the content item was posted. At block 606, the example method 600 can determine a particular profile picture having a timestamp that is nearest to, without being later than, the time when the content item was posted. At block 608, the example method 600 can identify the particular profile picture as the profile picture to be provided in association with the content item.

Figure 6B:
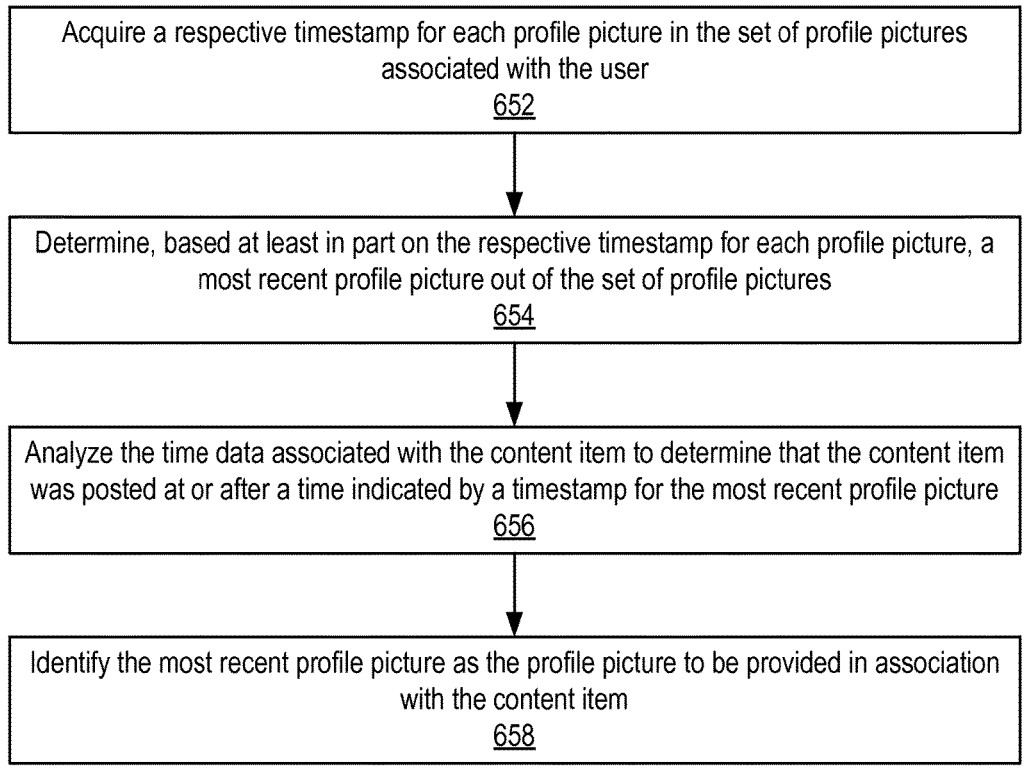
FIG. 6B illustrates an example method for implementing time-based association of content and profile information, according to an embodiment of the present disclosure.

FIG. 6B illustrates an example method 650 for implementing time-based association of content and profile information, according to an embodiment of the present disclosure. As discussed above, it should be understood that there can be additional, fewer, or alternative steps performed in similar or alternative orders, or in parallel, within the scope of the various embodiments unless otherwise stated.

The example method 650 can facilitate the identifying of the profile picture out of the set of profile pictures, as discussed previously. At block 652, the example method 650 can acquire a respective timestamp for each profile picture in the set of profile pictures associated with the user. At block 654, the example method 650 can determine, based at least in part on the respective timestamp for each profile picture, a most recent profile picture out of the set of profile pictures. At block 656, the example method 650 can analyze the time data associated with the content item to determine that the content item was posted at or after a time indicated by a timestamp for the most recent profile picture. At block 658, the example method 650 can identify the most recent profile picture as the profile picture to be provided in association with the content item.

In some embodiments, the content item can be posted by the user to at least one of a group associated with the user or an event associated with the user. In one example, the content item can correspond to a story item or a social interaction item indicating that the user has joined the group. As such, the profile picture of the user at the time of joining the group can be presented with the content item associated with the group. In another example, the content item can correspond to a story item or a social interaction item indicating that the user has replied (e.g., RSVP) to an event. Accordingly, the profile picture of the user at the time of replying to the event can be presented with the content item associated with the event.

In some embodiments, a mouse hover over the profile picture provided in association with the content item can be detected. A hover card can be provided for the user while the mouse hover is detected. The hover card can include a current profile picture of the user. Accordingly, for example, the identified profile picture can be provided with the content item, while the hover card for the user can provide the current profile picture.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
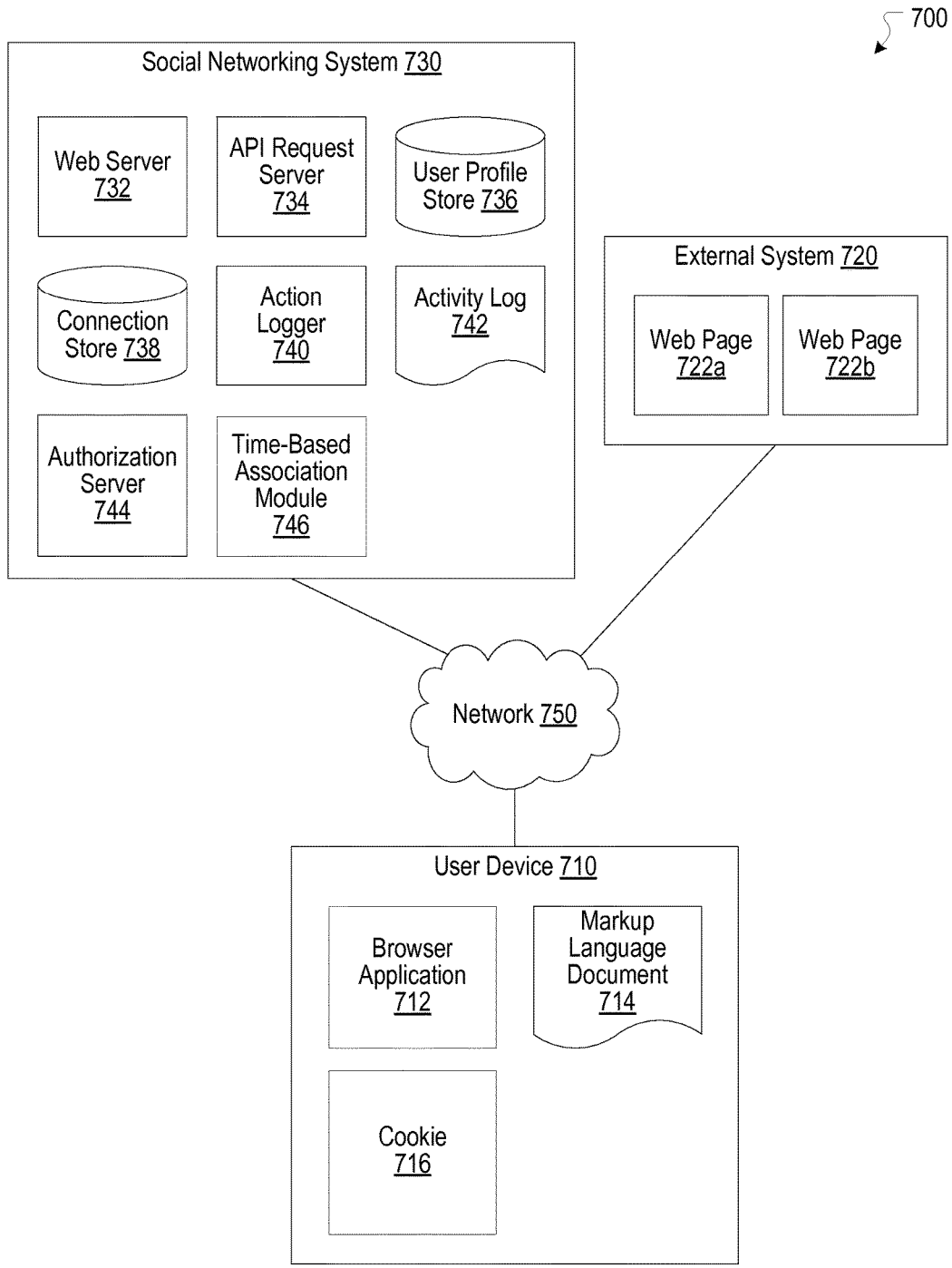
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "oneway." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a time-based association module 746. The time-based association module 746 can, for example, be implemented as the time-based association module 102 of FIG. 1. The time-based association module 746 can be configured to facilitate identifying a content item posted by a user. The time-based association module 746 can also be configured to facilitate acquiring time data associated with the content item. Moreover, the time-based association module 746 can be configured to facilitate identifying, based at least in part on the time data, a profile picture out of a set of profile pictures associated with the user. Furthermore, the time-based association module 746 can be configured to facilitate providing the profile picture in association with the content item. As discussed previously, it should be appreciated that there can be many variations and other possibilities. Other features of the time-based association 746 are discussed herein in connection with the time-based association module 102.

Hardware Implementation

Figure 8:
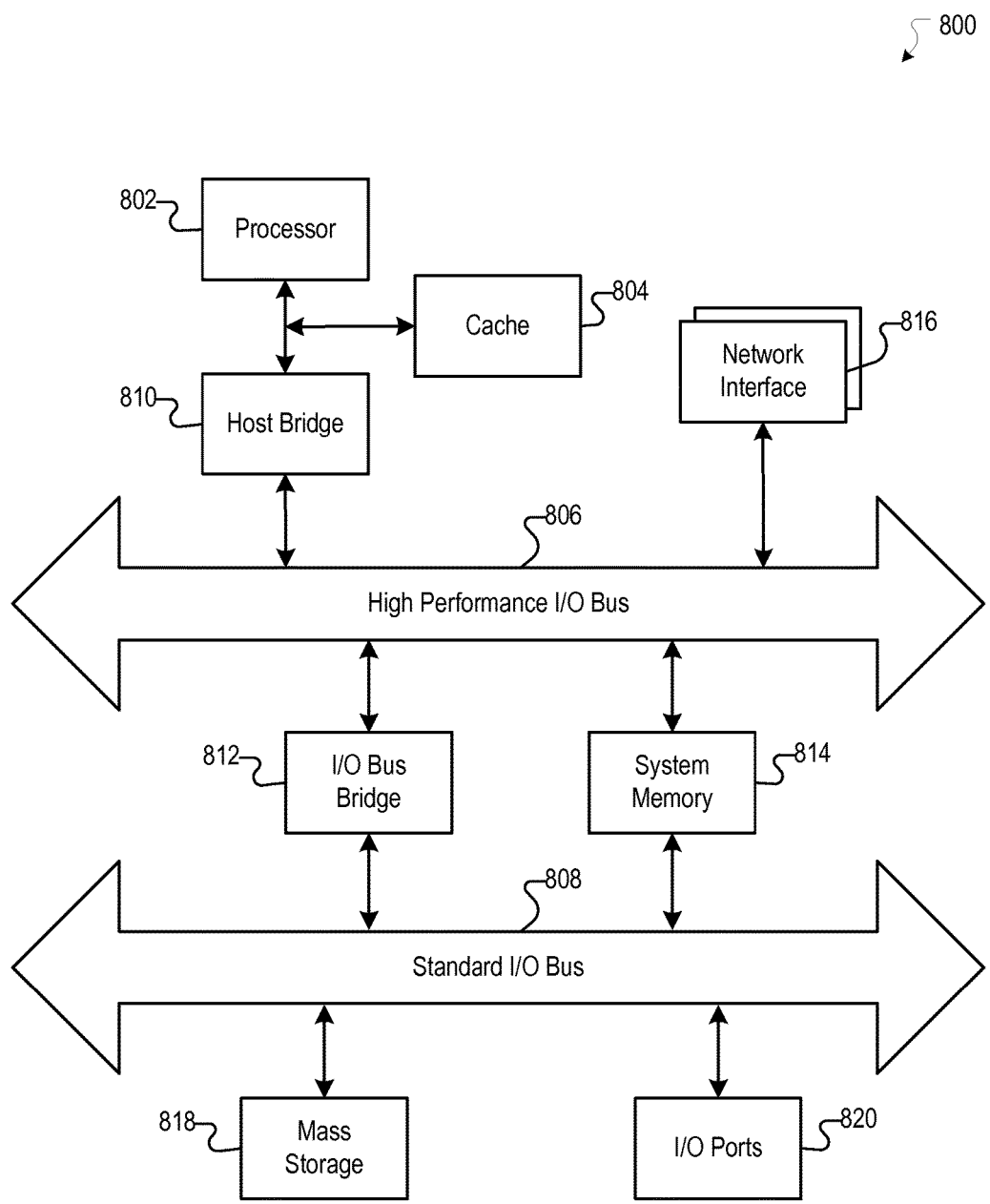
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, a content item posted by a user;
   acquiring, by the computing system, time data associated with the content item;
   selecting, by the computing system, for each viewing user, a profile picture out of a set of profile pictures associated with the user based on a timestamp of the profile picture that is nearest to a time when the content item was posted and one or more privacy settings associated with the user; and providing, by the computing system, for each viewing user, the selected profile picture for presentation in association with the content item, wherein the selected profile picture is accessible to the viewing user based on the one or more privacy settings associated with the user.

2. The computer-implemented method of claim 1, wherein the selecting of the profile picture out of the set of profile pictures further comprises:

acquiring a respective timestamp for each profile picture in the set of profile pictures associated with the user; and analyzing the respective timestamp for each profile picture and the time data associated with the content item, wherein the time data associated with the content item indicates a time when the content item was posted.

3. The computer-implemented method of claim 1, wherein the selecting of the profile picture out of the set of profile pictures further comprises:

acquiring a respective timestamp for each profile picture in the set of profile pictures associated with the user;

determining, based at least in part on the respective timestamp for each profile picture, a most recent profile picture out of the set of profile pictures;

analyzing the time data associated with the content item to determine that the content item was posted at or after a time indicated by a timestamp for the most recent profile picture; and identifying the most recent profile picture as the profile picture to be provided in association with the content item.

4. The computer-implemented method of claim 1, further comprising:

determining, based at least in part on the one or more privacy settings associated with the user, that a particular profile picture in the set of profile pictures is inaccessible to a particular viewing user; and preventing the particular profile picture from being provided in association with the content item when the content item is provided to the particular viewing user.

5. The computer-implemented method of claim 1, further comprising:

detecting that a particular profile picture is removed from the set of profile pictures; and preventing the particular profile picture from being provided in association with the content item when the content item is provided to a viewing user.

6. The computer-implemented method of claim 1, wherein the profile picture to be provided in association with the content item corresponds to a current profile picture of the user when other profile pictures in the set of profile pictures are unable to be provided in association with the content item.

7. The computer-implemented method of claim 1, wherein the content item is posted by the user to at least one of a group associated with the user or an event associated with the user.

8. The computer-implemented method of claim 1, further comprising:

detecting a mouse hover over the profile picture provided in association with the content item; and providing a hover card for the user while the mouse hover is detected, the hover card including a current profile picture of the user.

9. The computer-implemented method of claim 1, wherein the content item posted by the user is associated with at least one of a media content item posted by the user, text posted by the user, a status update posted by the user, a message posted by the user, a comment posted by the user, a content like posted by the user, a shared content item posted by the user, or a story content item posted by the user.

10. The computer-implemented method of claim 1, wherein the set of profile pictures corresponds to a profile picture album associated with the user at a social networking system.

11. A system comprising:

at least one processor; and a memory storing instructions that, when executed by the at least one processor, cause the system to perform:

identifying a content item posted by a user;

acquiring time data associated with the content item;

selecting, for each particular viewing user, a profile picture out of a set of profile pictures associated with the user based on a timestamp of the profile picture that is nearest to a time when the content item was posted and one or more privacy settings associated with the user; and providing, for each viewing user, the selected profile picture for presentation in association with the content item, wherein the selected profile picture is accessible to the viewing user based on the one or more privacy settings associated with the user.

12. The system of claim 11, wherein the selecting of the profile picture out of the set of profile pictures further comprises:

acquiring a respective timestamp for each profile picture in the set of profile pictures associated with the user; and analyzing the respective timestamp for each profile picture and the time data associated with the content item, wherein the time data associated with the content item indicates a time when the content item was posted.

13. The system of claim 11, wherein the selecting of the profile picture out of the set of profile pictures further comprises:

acquiring a respective timestamp for each profile picture in the set of profile pictures associated with the user;

determining, based at least in part on the respective timestamp for each profile picture, a most recent profile picture out of the set of profile pictures;

analyzing the time data associated with the content item to determine that the content item was posted at or after a time indicated by a timestamp for the most recent profile picture; and identifying the most recent profile picture as the profile picture to be provided in association with the content item.

14. The system of claim 11, wherein the instructions cause the system to further perform:

determining, based at least in part on the one or more privacy settings associated with the user, that a particular profile picture in the set of profile pictures is inaccessible to a particular viewing user; and preventing the particular profile picture from being provided in association with the content item when the content item is provided to the particular viewing user.

15. The system of claim 11, wherein the content item posted by the user is associated with at least one of a media content item posted by the user, text posted by the user, a status update posted by the user, a message posted by the user, a comment posted by the user, a content like posted by the user, a shared content item posted by the user, or a story content item posted by the user.

16. A non-transitory computer-readable storage medium including instructions that, when executed by at least one processor of a computing system, cause the computing system to perform:
   identifying a content item posted by a user;
   acquiring time data associated with the content item;
   selecting, for each viewing user, a profile picture out of a set of profile pictures associated with the user based on a timestamp of the profile picture that is nearest to a time when the content item was posted and one or more privacy settings associated with the user; and
   providing, for each viewing user, the selected profile picture for presentation in association with the content item, wherein the selected profile picture is accessible to the viewing user based on the one or more privacy settings associated with the user.

17. The non-transitory computer-readable storage medium of claim 16, wherein the selecting of the profile picture out of the set of profile pictures further comprises:
   acquiring a respective timestamp for each profile picture in the set of profile pictures associated with the user; and
   analyzing the respective timestamp for each profile picture and the time data associated with the content item, wherein the time data associated with the content item indicates a time when the content item was posted.

18. The non-transitory computer-readable storage medium of claim 16, wherein the selecting of the profile picture out of the set of profile pictures further comprises:
   acquiring a respective timestamp for each profile picture in the set of profile pictures associated with the user;
   determining, based at least in part on the respective timestamp for each profile picture, a most recent profile picture out of the set of profile pictures;
   analyzing the time data associated with the content item to determine that the content item was posted at or after a time indicated by a timestamp for the most recent profile picture; and
   identifying the most recent profile picture as the profile picture to be provided in association with the content item.

19. The non-transitory computer-readable storage medium of claim 16, wherein the instructions cause the system to further perform:
   determining, based at least in part on the one or more privacy settings associated with the user, that a particular profile picture in the set of profile pictures is inaccessible to a particular viewing user; and
   preventing the particular profile picture from being provided in association with the content item when the content item is provided to the particular viewing user.

20. The non-transitory computer-readable storage medium of claim 16, wherein the content item posted by the user is associated with at least one of a media content item posted by the user, text posted by the user, a status update posted by the user, a message posted by the user, a comment posted by the user, a content like posted by the user, a shared content item posted by the user, or a story content item posted by the user.

* * * * *